United States Patent
Ravi et al.

(10) Patent No.: US 9,022,147 B2
(45) Date of Patent: May 5, 2015

(54) DRILLING FLUID THAT WHEN MIXED WITH A CEMENT COMPOSITION ENHANCES PHYSICAL PROPERTIES OF THE CEMENT COMPOSITION

(75) Inventors: Krishna M. Ravi, Kingwood, TX (US); Donald L. Whitfill, Kingwood, TX (US); Rahul Chandrakant Patil, Pune (IN); Abhimanyu Deshpande, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 495 days.

(21) Appl. No.: 13/150,438

(22) Filed: Jun. 1, 2011

(65) Prior Publication Data

US 2012/0305248 A1    Dec. 6, 2012

(51) Int. Cl.
| | |
|---|---|
| *C09K 8/06* | (2006.01) |
| *C09K 8/08* | (2006.01) |
| *C04B 28/02* | (2006.01) |
| *C09K 8/03* | (2006.01) |
| *C09K 8/467* | (2006.01) |

(52) U.S. Cl.
CPC . *C09K 8/08* (2013.01); *C04B 28/02* (2013.01); *C09K 8/032* (2013.01); *C09K 8/467* (2013.01); *C09K 8/06* (2013.01); *C09K 2208/00* (2013.01)

(58) Field of Classification Search
None
See application file for complete search history.

(56) References Cited

U.S. PATENT DOCUMENTS

| | | | |
|---|---|---|---|
| 3,168,139 A | | 2/1965 | Kennedy |
| 4,478,640 A | | 10/1984 | Holland |
| 4,519,452 A | * | 5/1985 | Tsao et al. ........... 166/288 |
| 5,314,022 A | * | 5/1994 | Cowan et al. ........ 166/293 |
| 5,358,044 A | * | 10/1994 | Hale et al. ............ 166/293 |
| 5,398,758 A | * | 3/1995 | Onan et al. .......... 166/292 |
| 6,152,227 A | | 11/2000 | Lawson |
| 7,147,056 B2 | | 12/2006 | Brothers |
| 2004/0244650 A1 | * | 12/2004 | Brothers ............... 106/681 |

FOREIGN PATENT DOCUMENTS

| | | |
|---|---|---|
| WO | WO2007116196 A1 | 10/2007 |
| WO | WO2009083264 A1 | 7/2009 |
| WO | WO2011023939 A1 | 3/2011 |

OTHER PUBLICATIONS

Product Catalog; Sodium Orthosilicate MSDS; Strem Chemicals Inc.; Oct. 2001; pp. 1-4.*

(Continued)

*Primary Examiner* — Doug Hutton, Jr.
*Assistant Examiner* — Anuradha Ahuja
(74) *Attorney, Agent, or Firm* — Holly Soehnge; Sheri Higgons Law; Sheri Higgins

(57) ABSTRACT

According to an embodiment, a drilling fluid comprises: water and a set accelerator, wherein the drilling fluid has a 10 minute gel strength of less than 20 lb*ft/100 sq ft, wherein the drilling fluid has a density in the range of about 9 to about 14 pounds per gallon, wherein the drilling fluid remains pourable for at least 5 days, and wherein when at least one part of the drilling fluid mixes with three parts of a cement composition consisting of water and cement, the drilling fluid cement composition mixture develops a compressive strength of at least 1,200 psi. According to another embodiment, a method of using the drilling fluid comprises the steps of: introducing the drilling fluid into at least a portion of a subterranean formation, wherein at least a portion of the drilling fluid is capable of mixing with a cement composition.

18 Claims, 1 Drawing Sheet

(56) References Cited

OTHER PUBLICATIONS

Schlemmer, et al, Drilling Fluid Conversion: Selection and Use of Portland or Blast-Furnace-Slag Cement, Dec. 1994.

Wilson, et al, Conversion of Mud to Cement, Society of Petroleum Engineers 20452, 1990.

Cowan, et al, Conversion of Drilling Fluids to Cements With Blast Furnace Slag: Performance Properties and Applications for Well Cementing, Society of Petroleum Engineers 24575, 1992.

Nahm, et al, Slag Mix Mud Conversion Cementing Technology: Reduction of Mud Disposal Volumes and Management of Rig-Site Drilling Wastes, Society of Petroleum Engineers 25988, 1993.

* cited by examiner

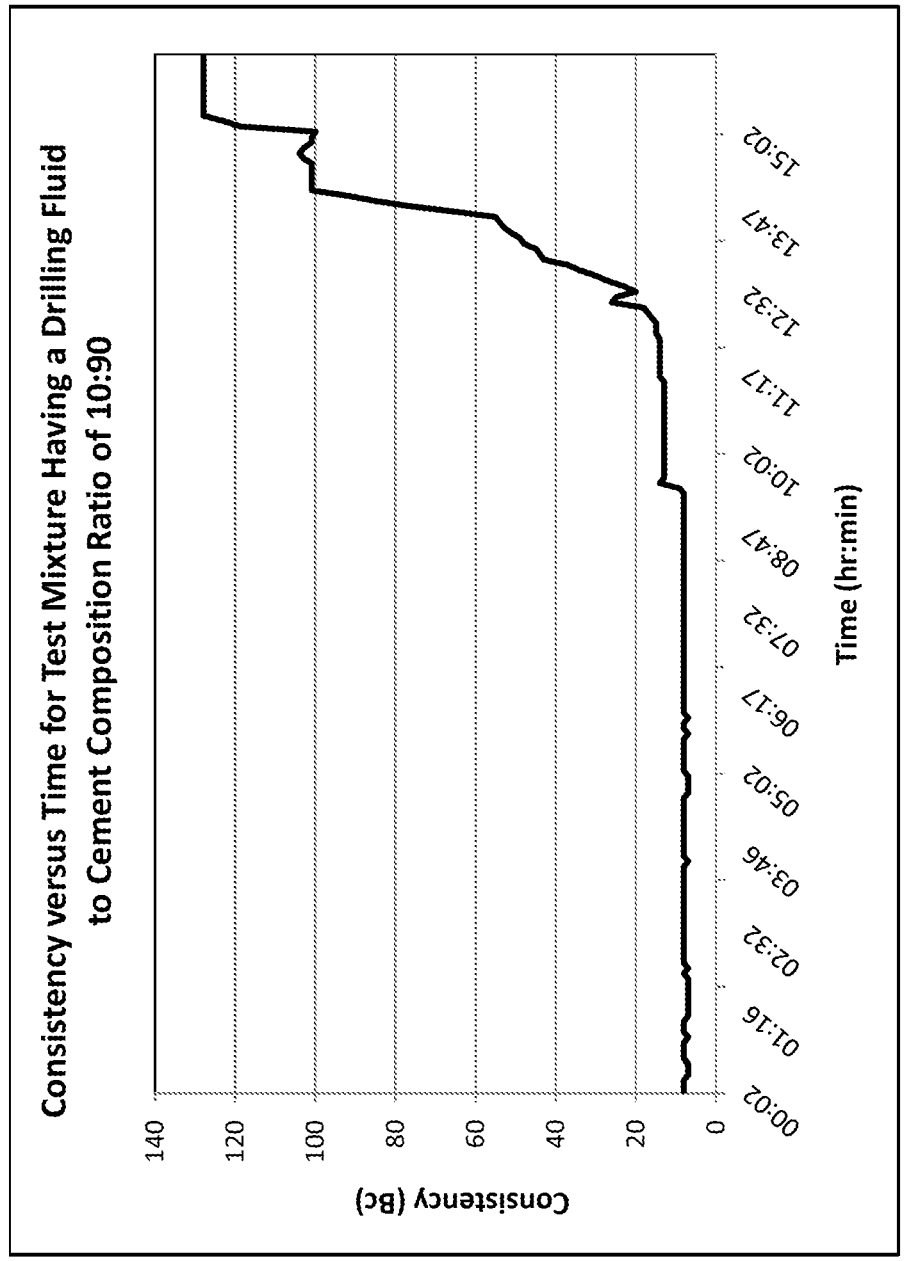

DRILLING FLUID THAT WHEN MIXED WITH A CEMENT COMPOSITION ENHANCES PHYSICAL PROPERTIES OF THE CEMENT COMPOSITION

TECHNICAL FIELD

A drilling fluid that is compatible with a cement composition is provided. A method of using the cement compatible drilling fluid is also provided. In certain embodiments, the drilling fluid maintains a fluid state, and when mixed with the cement composition, enhances at least some of the physical properties of the cement composition. According to some embodiments, the drilling fluid does not contain a clay.

SUMMARY

According to an embodiment, a method of using a drilling fluid comprises: introducing the drilling fluid into at least a portion of a subterranean formation, wherein the drilling fluid comprises: water and a set accelerator, wherein at least a portion of the drilling fluid is capable of mixing with a cement composition.

According to another embodiment, a method of using a drilling fluid comprises: introducing the drilling fluid into at least a portion of a subterranean formation, wherein the drilling fluid comprises: water and a set accelerator, wherein the drilling fluid has a 10 minute gel strength of less than 20 lb*ft/100 sq ft, wherein the drilling fluid has a density in the range of about 9 to about 14 pounds per gallon, wherein the drilling fluid remains pourable for at least 5 days, and wherein when at least one part of the drilling fluid mixes with three parts of a cement composition consisting of water and cement, the drilling fluid cement composition mixture develops a compressive strength of at least 1,200 psi.

According to another embodiment, a drilling fluid comprises: water and a set accelerator, wherein at least a portion of the drilling fluid is capable of mixing with a cement composition, and wherein a test mixture of the drilling fluid and a cement composition consisting of water and cement, having a drilling fluid to cement composition ratio of 1:3, develops a compressive strength of at least 1,200 psi; whereas, a substantially identical test mixture, except that the drilling fluid does not contain the set accelerator, develops a compressive strength of less than 1,200 psi.

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIG. 1 is a graph of consistency (Bc) versus time (hr:min), showing the thickening time for a test mixture containing 1 part of a drilling fluid to 9 parts of a cement composition.

DETAILED DESCRIPTION

As used herein, the words "comprise," "have," "include," and all grammatical variations thereof are each intended to have an open, non-limiting meaning that does not exclude additional elements or steps.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase. As used herein, a "fluid state" means a substance that is a fluid and is not a gel or a solid. As used herein, the term "water-based" means a heterogeneous fluid in which the continuous liquid phase is an aqueous liquid. As used herein, the term "oil-based" means a heterogeneous fluid in which the continuous phase is a liquid hydrocarbon.

A "gel" refers to a substance that does not easily flow and in which shearing stresses below a certain finite value fail to produce permanent deformation. A substance can develop gel strength. The higher the gel strength, the more likely the substance will become a gel. Conversely, the lower the gel strength, the more likely the substance will remain in a fluid state. Although there is not a specific dividing line for determining whether a substance is a gel, generally, a substance with a 10 minute gel strength greater than 100 lb*ft/100 sq ft (47.88 Pa) will become a gel. Alternatively, generally, a substance with a 10 minute gel strength less than 100 lb ft/100 sq ft (47.88 Pa) will remain in a fluid state.

As used herein, a "cement composition" is a mixture of at least cement and water, and possibly additives. As used herein, the term "cement" means an initially dry substance that, in the presence of water, acts as a binder to bind other materials together. An example of cement is Portland cement. A cement composition is generally a slurry in which the water is the continuous phase of the slurry and the cement (and any other insoluble particles) is the dispersed phase. The continuous phase can include dissolved solids.

Oil and gas hydrocarbons are naturally occurring in some subterranean formations. A subterranean formation containing oil or gas is sometimes referred to as a reservoir. A reservoir may be located under land or off shore. In order to produce oil or gas, a wellbore is drilled into a reservoir or adjacent to a reservoir.

A well can include, without limitation, an oil, gas, water, or injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A wellbore is formed using a drill bit. A drill string can be used to aid the drill bit in drilling through the subterranean formation to form the wellbore. The drill string can include a drilling pipe. During drilling operations, a drilling fluid, sometimes referred to as a drilling mud, may be circulated downwardly through the drilling pipe, and back up the annulus between the wellbore and the outside of the drilling pipe. The drilling fluid performs various functions, such as cooling the drill bit, maintaining the desired pressure in the well, and carrying drill cuttings upwardly through the annulus between the wellbore and the drilling pipe.

During well completion, it is common to introduce a cement composition into a portion of an annulus in a wellbore. For example, in a cased-hole wellbore, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or gravel packing operations.

A spacer fluid can be introduced into the wellbore after the drilling fluid and before the cement composition. The spacer fluid can be circulated down through a drill string or tubing string and up through the annulus. The spacer fluid functions to remove the drilling fluid from the wellbore.

It is desirable to remove a drilling fluid completely from a wellbore before or during the introduction of a cement composition into the wellbore. Some drilling fluids are more difficult to remove from the wellbore compared to other drilling fluids. For example, depending on the ingredients in a water-based drilling fluid, a water-based drilling fluid can be difficult to remove from the wellbore. A common ingredient in a drilling fluid is a clay. Clays can include bentonite, hectorite, kaolinite, attapulgite, and sepiolite. Some clays are hygroscopic. Hygroscopicity is the ability of a substance to attract and hold water molecules from the surrounding environment through either absorption or adsorption, with the substance becoming physically changed, for example by swelling, as water molecules become suspended between the substance's molecules in the process. Because of the hygroscopic nature of some clays, the clay in a drilling fluid can swell in the presence of water and become a gel. For example, if a water-based drilling fluid contains a hygroscopic clay, such as bentonite, then the clay can swell in the presence of the aqueous continuous phase and become a gel. A drilling fluid that becomes a gel is more difficult to remove from a wellbore compared to a drilling fluid that remains in a fluid state.

Even though a spacer fluid may be used, and regardless of the type of drilling fluid used or the ingredients in the drilling fluid, it is extremely difficult to remove all of the drilling fluid from a wellbore. The remaining drilling fluid in the wellbore is commonly referred to as a "mud-pocket". When a cement composition is then introduced into the wellbore, the cement composition can mix with the mud pockets and become "contaminated." Some of the ingredients in the drilling fluid can cause adverse effects on some of the physical properties of the contaminated cement composition. For example, the rheology and compressive strength of the contaminated cement composition can be adversely affected. Moreover, it is harder for a cement composition to mix with a gelled drilling fluid compared to a drilling fluid in a fluid state. The cement composition may not be able to form a bond with the gelled drilling fluid. As a result, the cement composition may not properly set and form a bond with the substrates (e.g., a casing or a face of a formation) that it was designed to bond to. Consequently, there may be areas within the annulus that are not sealed by the cement, thus allowing for the flow of fluids into or out of those areas.

Some of the physical properties of a cement composition can be adversely affected by, inter alia: dilution of the cement composition with the drilling fluid; and ingredients (e.g., organic materials) in the drilling fluid that can act as a set retarder for the cement composition. Some of the ingredients in the drilling fluid, such as clays, can get bound in the matrix of the cement composition, thus decreasing the compressive strength of the composition. There is a need for a drilling fluid that: (1) remains in a fluid state after being introduced into the well such that, if not completely removed, it can mix with a subsequently-introduced cement composition; (2) includes ingredients that do not adversely affect the physical characteristics of the cement composition, but rather enhance the physical characteristics of the cement composition; and (3) after mixing with a subsequently-introduced cement composition, the mixture sets, thus allowing for a more complete zonal isolation.

It has been discovered that a water-based drilling fluid containing a set accelerator can: remain in a fluid state, allowing for improved mixing with a cement composition compared to a gelled drilling fluid; and when mixed with a cement composition can be used to enhance at least some of the physical properties of the cement composition. The drilling fluid/cement composition mixture may exhibit better rheology and develop a higher compressive strength compared to a mixture wherein the drilling fluid does not contain a set accelerator.

During drilling operations, it is desirable for the drilling fluid to remain pumpable during introduction into and removal from the subterranean formation. During cementing operations, it is desirable for the cement composition to remain pumpable during introduction into the well and until the cement composition is situated in the portion of the well to be cemented. After the cement composition has reached the portion of the well to be cemented, the cement composition can ultimately set. A drilling fluid or cement composition that thickens too quickly while being pumped can damage pumping equipment or block tubing or pipes. A cement composition that sets too slowly can cost time and money while waiting for the composition to set.

If any test (e.g., thickening time or compressive strength) requires the step of mixing, then the substance is mixed according to the following procedures. For the drilling fluid, the water is added to a mixing container and the viscosifier is added to the water and allowed to hydrate. The remaining drilling fluid ingredients, except for the weighting agent and pH adjuster are added to the container at a uniform rate in not more than 15 seconds (s). The motor of the base is then turned on and maintained at 4,000 revolutions per minute (rpm) for up to several minutes to ensure proper dispersion. The weighting agent is then added to the container and the drilling fluid is mixed again. Finally, the pH of the drilling fluid is determined and, if needed, a pH adjuster is added to the drilling fluid to obtain the desired pH. It is to be understood that any mixing is performed at ambient temperature and pressure (about 71° F. (22° C.) and about 1 atm (0.1 MPa)). For the cement composition, the water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). If the drilling fluid and the cement composition are to be mixed together to form a "test mixture," then a stated amount by volume of the drilling fluid is added to a mixing container and a stated amount by volume of the cement composition is then added to the container. The test mixture is mixed by hand and, if needed, may be mixed at a rpm of not greater than 4,000 rpm to ensure proper mixing. The stated amount of drilling fluid to cement composition may be stated as a ratio. For example, 25:75 or 10:90.

It is also to be understood that if any test (e.g., thickening time or compressive strength) requires the test be performed at a specified temperature and possibly a specified pressure, then the temperature and pressure of the substance (e.g., drilling fluid, cement composition, or test mixture) is ramped up to the specified temperature and pressure after being mixed at ambient temperature and pressure. For example, the substance can be mixed at 71° F. (22° C.) and 1 atm (0.1 MPa) and then placed into the testing apparatus and the temperature of the substance can be ramped up to the specified temperature. As used herein, the rate of ramping up the temperature is generally in the range of not more than about 3° F./min to about 5° F./min (about 1.67° C./min to about 2.78° C./min). After the substance is ramped up to the specified temperature and possibly pressure, the substance is maintained at that temperature and pressure for the duration of the testing.

As used herein, the "thickening time" is how long it takes for a substance to become unpumpable at a specified temperature and pressure. The pumpability of a substance is related to the consistency of the substance. The consistency of a substance is measured in Bearden units of consistency (Bc), a dimensionless unit with no direct conversion factor to the more common units of viscosity. As used herein, a substance becomes "unpumpable" when the consistency of the substance reaches 70 Bc. As used herein, the consistency of a substance is measured as follows. The substance is mixed. The substance is then placed in the test cell of a High-Temperature, High-Pressure (HTHP) consistometer, such as a FANN® Model 275 or a Chandler Model 8240. Consistency measurements are taken continuously until the cement composition exceeds 70 Bc.

Rheology is a unit-less measure of how a material deforms and flows. Rheology includes the material's elasticity, plasticity, and viscosity. As used herein, the "rheology" of a substance is measured as follows. The substance is mixed. The substance is placed into the test cell of a rotational viscometer, such as a FANN® Model 35 viscometer, fitted with a Bob and Sleeve attachment and a spring number 1. The substance is tested at the specified temperature and ambient pressure, about 1 atm (0.1 MPa). Rheology readings are taken at multiple rpm's, for example, at 3, 6, 30, 60, 100, 200, 300, and 600.

A substance can develop gel strength. As used herein, the "initial gel strength" of a substance is measured as follows. After the rheology testing of the substance is performed, the substance is allowed to sit in the test cell for 10 seconds (s). The motor of the viscometer is then started at 3 rpm. The maximum deflection on the dial reading is multiplied by the spring constant and also multiplied by a conversion constant of 0.5099 to obtain a gel strength in units of Pascals (Pa). The gel strength in Pa can then be multiplied by a conversion constant of 2.0885 to obtain a gel strength in units of lb*ft/100 sq ft. As used herein, the "10 min gel strength" is measured as follows. After the initial gel strength test has been performed, the substance is allowed to sit in the test cell for 10 minutes (min). The motor of the viscometer is then started at 3 rpm. The maximum deflection on the dial reading is then multiplied as described above to obtain a gel strength in units of either Pa or lb*ft/100 sq ft. The lower the value for the initial and 10 min gel strengths, the more likely the substance will remain in a fluid state. Moreover, if the difference between the initial and 10 min gel strengths is very low (generally a difference of about less than 10 units), then the substance can be called a flat gel; whereas a substance with a difference of more than 10 units can be called a progressive gel. A flat gel indicates that the gelation of the substance is not gaining much strength with time; whereas, a progressive gel indicates that the gelation of the substance is rapidly gaining strength with time.

A cement composition can develop compressive strength. Cement composition compressive strengths can vary and can exceed 10,000 psi (69 MPa). As used herein, the "compressive strength" of a cement composition or a test mixture is measured at ambient temperature (about 71° F., about 22° C.) using the destructive method as follows. The substance is mixed. The substance is then cured until the substance has set. As used herein, the term "set," and all grammatical variations thereof, is intended to mean the process of becoming hard or solid by curing. The set substance is then placed into a compression-testing device, such as a SUPER "L"™ Universal testing machine model 602, available from Tinius Olsen, Horsham in Pennsylvania, USA. The pressure is gradually increased until the substance breaks. The compressive strength is calculated as the force required to break the substance divided by the smallest cross-sectional area in contact with the load-bearing plates of the compression-testing device. The compressive strength is reported in units of pressure, such as pound-force per square inch (psi) or megapascals (MPa).

According to an embodiment, a method of using a cement compatible drilling fluid comprises the steps of: introducing the drilling fluid into at least a portion of a subterranean formation, wherein the drilling fluid comprises: water and a set accelerator, wherein at least a portion of the drilling fluid is capable of mixing with a cement composition.

According to another embodiment, a method of using a cement compatible drilling fluid comprises the steps of: introducing the drilling fluid into at least a portion of a subterranean formation, wherein the drilling fluid comprises: water and a set accelerator, wherein the drilling fluid has a 10 minute gel strength of less than 20 lb*ft/100 sq ft, wherein the drilling fluid has a density in the range of about 9 to about 14 pounds per gallon, wherein the drilling fluid remains pourable for at least 5 days, and wherein when at least one part of the drilling fluid mixes with three parts of a cement composition consisting of water and cement, the drilling fluid cement composition mixture develops a compressive strength of at least 1,200 psi.

According to another embodiment, a drilling fluid comprises: water and a set accelerator, wherein at least a portion of the drilling fluid is capable of mixing with a cement composition, and wherein a test mixture of the drilling fluid and a cement composition consisting of water and cement, having a drilling fluid to cement composition ratio of 1:3, develops a compressive strength of at least 1,200 psi; whereas, a substantially identical test mixture, except that the drilling fluid does not contain the set accelerator, develops a compressive strength of less than 1,200 psi.

The discussion of preferred embodiments regarding the drilling fluid, the cement composition, the test mixture, or any ingredient in the afore-mentioned, is intended to apply to the composition embodiments and the method embodiments. Any reference to the unit "gallons" means U.S. gallons.

According to certain embodiments, a test mixture of the drilling fluid and a cement composition consisting of water and cement, having a drilling fluid to cement composition ratio of 1:3, develops a compressive strength of at least 1,200 psi (8.3 MPa), alternatively at least 800 psi (5.5 MPa); whereas, a substantially identical test mixture, except that the drilling fluid does not contain the set accelerator, develops a compressive strength of less than 1,200 psi (8.3 MPa), alternatively less than 800 psi (5.5 MPa). According to another embodiment, a test mixture of the drilling fluid and a cement composition consisting of water and cement, having a drilling fluid to cement composition ratio of 10:90, develops a compressive strength of at least 2,000 psi (13.8 MPa), alternatively at least 1,500 psi (10.3 MPa); whereas, a substantially identical test mixture, except that the drilling fluid does not contain the set accelerator, develops a compressive strength of less than 2,000 psi (13.8 MPa), alternatively less than 1,500 psi (10.3 MPa). According to other embodiments, when at least one part of the drilling fluid mixes with three parts of a cement composition consisting of water and cement, the drilling fluid cement composition mixture develops a compressive strength of at least 1,200 psi (8.3 MPa), alternatively at least 800 psi (5.5 MPa). In another embodiment, a test mixture of the drilling fluid and a cement composition consisting of water and cement, having a drilling fluid to cement composition ratio of 3:1, sets; whereas, a substantially identical test mixture, except that the drilling fluid does not contain the set accelerator, does not set. In yet another embodiment, a test mixture of the drilling fluid and a cement composition consisting of water and cement, having a drilling fluid to cement composition ratio of 3:1, develops a compressive strength of at least 60 psi (0.4 MPa); whereas, a substantially identical test mixture, except that the drilling fluid does not contain the set accelerator, develops a compressive strength of less than 60 psi (0.4 MPa).

It is to be understood that if any of the embodiments specify a "test mixture," then the composition of the drilling fluid comprises those ingredients listed and does not exclude additional ingredients; however, the composition of the cement composition consists of water and cement only and does exclude additional ingredients.

The drilling fluid includes water. The water can be selected from the group consisting of freshwater, brackish water, saltwater, and any combination thereof. The drilling fluid can further include a water-soluble salt. Preferably, the salt is selected from sodium chloride, calcium chloride, calcium bromide, potassium chloride, potassium bromide, magnesium chloride, and any combination thereof.

The drilling fluid includes a set accelerator. The set accelerator can be selected from the group consisting of sodium metasilicate, potassium orthosilicate, sodium orthosilicate, and combinations thereof. Commercially-available examples of a suitable set accelerator include, but are not limited to, CALSEAL® 60, FLO-CHECK®, ECONOLITE®, and combinations thereof, marketed by Halliburton Energy Services, Inc. According to an embodiment, the set accelerator is in a concentration of at least 3% by weight of the water (bww). The set accelerator can also be in a concentration in the range of about 3% to about 10% bww. According to another embodiment, the set accelerator is in at least a sufficient concentration such that the 1:3 test mixture develops a compressive strength of at least 1,200 psi (8.3 MPa), while the test mixture without the set accelerator develops a compressive strength of less than 1,200 psi (8.3 MPa). According to yet another embodiment, the set accelerator is in at least a sufficient concentration such that the 10:90 test mixture develops a compressive strength of at least 2,000 psi (13.8 MPa), while the test mixture without the set accelerator develops a compressive strength of less than 2,000 psi (13.8 MPa).

The drilling fluid can further include a viscosifier. The viscosifier can be selected from the group consisting of a xanthan gum polymer, cellulose, derivatives thereof, and any combinations thereof. Commercially-available examples of a suitable viscosifier include, but are not limited to, BARAZAN® D PLUS, BARAZAN®, BARAZAN® D, WG-17®, and combinations thereof, marketed by Halliburton Energy Services, Inc. According to an embodiment, the viscosifier is in a concentration of at least 0.2% bww. The viscosifier can also be in a concentration in the range of about 0.2% to about 1% bww. According to another embodiment, the viscosifier is in at least a sufficient concentration such that the drilling fluid has a 10 min gel strength of less than 20 lb*ft/100 sq ft (9.57 Pa).

The drilling fluid can have a pH in the range of about 7.5 to about 12.5. The drilling fluid can further comprise a pH adjuster. The pH adjuster can be an acid or a base. According to an embodiment, the pH adjuster is selected and the pH adjuster is in a concentration such that the drilling fluid has a pH in the range of about 7.5 to about 12.5.

The drilling fluid can also include a weighting agent. The weighting agent can be selected from the group consisting of barite, hematite, manganese tetroxide, calcium carbonate, and combinations thereof. According to an embodiment, the weighting agent is selected such that the drilling fluid has a 10 min gel strength of less than 20 lb*ft/100 sq ft (9.57 Pa). According to another embodiment, the weighting agent is selected such that the drilling fluid remains in a fluid state for a specified period of time. The specified period of time can be in the range of about 3 days to about 14 days. The specified period of time can also be in the range of about 7 days to about 10 days. The specified period of time can also be the time it takes for a cement composition to be introduced into the portion of the subterranean formation after the step of introducing the drilling fluid. According to another embodiment, the weighting agent is not a clay. According to yet another embodiment, the drilling fluid does not form a filtercake on a face of the portion of the subterranean formation. Commercially-available examples of a suitable weighting agent include, but are not limited to, BAROID®, MICRONAX™, BARACARB®, and combinations thereof, marketed by Halliburton Energy Services, Inc. According to an embodiment, the weighting agent is in a concentration of at least 60% bww. The weighting agent can also be in a concentration in the range of about 60% to about 80% bww. According to another embodiment, the weighting agent is in at least a sufficient concentration such that the drilling fluid has a density in the range of about 9 to about 14 pounds per gallon "ppg" (about 1.1 to about 1.7 kilograms per liter "kg/L").

The drilling fluid can include a set retarder. The set retarder can be selected from the group consisting of a lignosulfonate, a lignite, a synthetic polymer, and combinations thereof. Commercially-available examples of a suitable set retarder include, but are not limited to, HR®-4, HR®-5, HR®-6, HR®-12, HR®-20, HR®-25, SCR-100™, SCR-500™, and combinations thereof, marketed by Halliburton Energy Services, Inc. According to an embodiment, the set retarder is in a concentration of at least 0.05% bww. The set retarder can also be in a concentration in the range of about 0.05% to about 0.3% bww. According to an embodiment, the set retarder is in at least a sufficient concentration such that the drilling fluid has a 10 min gel strength of less than 20 lb*ft/100 sq ft (9.57 Pa). According to another embodiment, the set retarder is in at least a sufficient concentration such that the drilling fluid remains in a fluid state for a specified period of time. The specified period of time can be in the range of about 3 days to about 14 days. The specified period of time can also be in the range of about 7 days to about 10 days. The specified period of time can also be the time it takes for a cement composition to be introduced into the portion of the subterranean formation after the step of introducing the drilling fluid.

According to an embodiment, at least a portion of the drilling fluid is capable of mixing with a cement composition. The methods can further include at least a portion of the drilling fluid is capable of mixing with the cement composition for a specified period of time. The specified period of time can be at least 3 days. The specified period of time can also be in the range of about 3 days to about 14 days. The specified period of time can also be in the range of about 7 days to about 10 days. According to another embodiment, the specified period of time is the time it takes for a cement composition to be introduced into the portion of the subterranean formation. According to this embodiment, the step of introducing the cement composition into the portion of the subterranean formation is preferably performed after the step of introducing the drilling fluid into the portion of the subterranean formation. According to yet another embodiment, the set retarder is in at least a sufficient concentration such that the at least a portion of the drilling fluid is capable of mixing with the cement composition for the specified period of time.

The drilling fluid can also include a dispersant. The dispersant can be selected from the group consisting of lignosulfonates, lignite, alcohol derivatives, and combinations thereof. Commercially-available examples of a suitable dispersant include, but are not limited to, QUIK-THIN®, THERMA-THIN®, ENVIRO-THIN™, DEEP-TREAT™, COLDTROL™, and combinations thereof, marketed by Halliburton Energy Services, Inc. According to an embodiment, the dispersant is in a concentration of at least 0.25% bww. The dispersant can also be in a concentration in the range of about 0.25% to about 3% bww.

The drilling fluid can also include a friction reducer. Commercially-available examples of a suitable friction reducer include, but are not limited to, CFR-2™, CFR-3™, CFR-5LE™, CFR-6™, CFR-8™, and combinations thereof, marketed by Halliburton Energy Services, Inc. The friction reducer can be in a concentration of at least 0.5% bww. The friction reducer can also be in a concentration in the range of about 0.5% to about 5% bww.

In an embodiment, a test mixture of the drilling fluid and a cement composition consisting of water and cement, having a drilling fluid to cement composition ratio of 10:90, has a thickening time of less than 16 hours; whereas, a substantially identical test mixture, except that the drilling fluid does not contain the set accelerator, has a thickening time of greater than 16 hours, when tested at a temperature of 80° F. (26.7° C.) and a pressure of 1 atm.

If any embodiment discloses a cement composition, then the cement composition includes at least water and cement. The water can be selected from the group consisting of freshwater, brackish water, saltwater, and any combination thereof. The cement can be Class A cement, Class C cement, Class G cement, Class H cement, fly ash, slag, volcanic ash, and any combination thereof. Preferably, the cement is Class G cement or Class H cement.

According to the method embodiments, the methods include the step of introducing the drilling fluid into at least a portion of a subterranean formation. The step of introducing can be for the purpose of drilling a wellbore to form a well. In an embodiment, at least a portion of a wellbore is formed by drilling the wellbore with the drilling fluid. The drilling fluid can be in a pumpable state before and during introduction into the subterranean formation. The well can be an oil, gas, water, or injection well. The well into a subterranean formation can include an annulus. The step of introducing the drilling fluid can include introducing the drilling fluid into a portion of the annulus.

The methods can further include the step of introducing a spacer fluid into the at least a portion of the subterranean formation after the step of introducing the drilling fluid. The methods can also further include the step of introducing a cement composition into the at least a portion of the subterranean formation. Preferably, the step of introducing the cement composition is performed after the step of introducing the drilling fluid. If the methods also include the step of introducing a spacer fluid, then preferably, the step of introducing the cement composition is performed after the step of introducing the spacer fluid. The step of introducing the cement composition can be for the purpose of at least one of the following: well completion; foam cementing; primary or secondary cementing operations; well-plugging; gravel packing, and zonal isolation. The cement composition can be in a pumpable state before and during introduction into the subterranean formation. The step of introducing can include introducing the cement composition into the well. According to another embodiment, the subterranean formation is penetrated by a well and the well includes an annulus. According to this other embodiment, the step of introducing can include introducing the cement composition into a portion of the annulus.

If the method embodiments further include the step of introducing a cement composition into the subterranean formation, then the cement composition comprises water and cement. According to these embodiments, the cement composition can further include additives. Examples of an additive include, but are not limited to, a filler, a fluid loss additive, a set retarder, a friction reducer, a strength-retrogression additive, a defoaming agent, a high-density additive, a set accelerator, a mechanical property enhancing additive, a lost-circulation material, a filtration-control additive, a thixotropic additive, a nano-particle, and combinations thereof.

The cement composition can include a filler. Suitable examples of fillers include, but are not limited to, fly ash, sand, clays, and vitrified shale. The filler can be in a concentration in the range of about 5% to about 50% by weight of the cement (bwc).

The cement composition can include a fluid loss additive. Suitable examples of commercially-available fluid loss additives include, but are not limited to, HALAD®-344, HALAD®-413, and HALAD®-300, marketed by Halliburton Energy Services, Inc. The fluid loss additive can be in a concentration in the range of about 0.05% to about 10% bwc.

The cement composition can include a set retarder. Suitable examples of commercially-available set retarders include, but are not limited to HR®-4, HR®-5, HR®-6, HR®-12, HR®-20, HR®-25, SCR-100™, and SCR-500™, marketed by Halliburton Energy Services, Inc. The set retarder can be in a concentration in the range of about 0.05% to about 10% bwc.

The cement composition can include a friction reducer. Suitable examples of commercially-available friction reducers include, but are not limited to, CFR-2™, CFR-3™, CFR-5LE™, CFR-6™, and CFR-8™, marketed by Halliburton Energy Services, Inc. The friction reducer can be in a concentration in the range of about 0.1% to about 10% bwc.

The cement composition can include a strength-retrogression additive. Suitable examples of commercially-available strength-retrogression additives include, but are not limited to, SSA-1™ and SSA-2™, marketed by Halliburton Energy Services, Inc. The strength-retrogression additive can be in a concentration in the range of about 5% to about 50% bwc.

The cement composition can include a set accelerator. The set accelerator can be selected from the group consisting of sodium metasilicate, potassium orthosilicate, sodium orthosilicate, and combinations thereof. Commercially-available examples of a suitable set accelerator include, but are not limited to, CALSEAL® 60, FLO-CHECK®, ECONO-LITE®, and combinations thereof, marketed by Halliburton Energy Services, Inc.

Commercially-available examples of other additives include, but are not limited to, HIGH DENSE® No. 3 weight additive, HIGH DENSE® No. 4 weight additive, BARITE™ heavyweight additive, MICROMAX™ weight additive, SILICALITE™ additive for light-weight cement compositions, WELLLIFE® 665 strength additive, WELLLIFE® 809 strength additive, WELLLIFE® 810 strength additive, and CHANNEL SEAL™ settable spotting fluid, marketed by Halliburton Energy Services, Inc.

According to the method embodiments, preferably, at least a portion of any drilling fluid remaining in the subterranean formation after the step of introducing the drilling fluid is capable of mixing with the cement composition. According to these embodiments, the drilling fluid and the cement composition are capable of forming a "mixture." According to this embodiment, the mixture can contain about 2% to about 30% by volume of the drilling fluid.

The mixture can have a thickening time of at least 3 hours at the bottomhole temperature and pressure. As used herein, the term "bottomhole" refers to the portion of the subterranean formation that the drilling fluid is introduced into. The mixture can also have a thickening time in the range of about 3 hours to about 20 hours at the bottomhole temperature and pressure. According to another embodiment, the mixture has a setting time of less than 48 hours at the bottomhole temperature and pressure. The mixture, can have a setting time of less than 24 hours at the bottomhole temperature and pressure. According to yet another embodiment, the mixture has a compressive strength of at least 1,000 psi (6.9 MPa) at the bottomhole temperature and pressure. The mixture can also have a compressive strength of at least 2,000 psi (13.8 MPa) at the bottomhole temperature and pressure.

The method embodiments can also include the step of allowing the mixture to set. The step of allowing the mixture to set can be after the step of introducing the cement composition into the subterranean formation. The method can include the additional steps of perforating, fracturing, or performing an acidizing treatment, after the step of allowing the mixture to set.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables and figures, the concentration of any ingredient in a cement composition or a drilling fluid can be expressed as a percent by weight of the water (abbreviated as "% bww"); pounds per barrel (abbreviated as "lb/bbl"); or gallons per sack of cement (abbreviated as "gal/sk").

The drilling fluid had a density of 12 pounds per gallon (lb/gal). The cement compositions included deionized water, Class H cement, and CFR®-3L, friction reducer at a concentration of 0.05 gal/sk and had a density of 15.6 lb/gal.

Each of the drilling fluid, the cement composition, and the drilling fluid/cement composition mixture ("test mixture") were mixed and tested according to the procedure for the specific test as described in The Detailed Description section above. The ratio of drilling fluid to cement composition for each test mixture is listed as either 75:25, 25:75, or 10:90. Rheology testing, and initial and 10 minute gel strength tests were conducted at a temperature of 80° F. (26.7° C.). The compressive strength tests were conducted by curing the sample for 72 hours until set at a temperature of 80° F. (26.7° C.). The thickening time test was conducted at a temperature of 80° F. (26.7° C.) and a pressure of 750 psi (5.2 MPa).

Table 1 contains a list of the ingredients and their respective concentrations for the drilling fluid. The drilling fluid contained deionized water. BARAZAN® D PLUS is a powdered xanthan gum polymer viscosifier that has been treated with a dispersant. Sodium hydroxide is a pH adjuster. BAROID® is a weighting agent comprising barite. CAL SEAL® 60 is a hemihydrate form of calcium sulfate set accelerator and FLO-CHECK® is a silicate system set accelerator. HR®-5 is a chemically-modified lignosulfonate set retarder and CFR®-3L friction reducer is a condensation reaction product of formaldehyde, acetone and sodium bisulfite.

TABLE 1

|  | Concentration | |
| --- | --- | --- |
| Ingredient | lb/bbl | % bww |
| BARAZAN ® D PLUS | 1.00 | 0.37 |
| NaOH | 1.00 | 0.37 |
| BAROID ® | 211.00 | 78.44 |
| CAL SEAL ® 60 | 15.00 | 5.58 |
| FLO-CHECK ® | 5.00 | 1.86 |
| Water | 269.00 | — |
| HR ®-5 | 0.30 | 0.11 |
| CFR ®-3L | 2.00 | 0.74 |

Table 2 contains rheology data for the drilling fluid, several test mixtures, and the cement composition. As can be seen in Table 2, the drilling fluid exhibited good rheologies. As can also be seen in Table 2, the test mixtures exhibited improved rheologies as the amount of cement composition increased. Moreover, each of the test mixtures exhibited comparable rheologies compared to the cement composition.

TABLE 2

| | Rheology rpm | | | | | | | |
| --- | --- | --- | --- | --- | --- | --- | --- | --- |
| Type of Fluid | 600 | 300 | 200 | 100 | 60 | 30 | 6 | 3 |
| Drilling Fluid | 50 | 32 | 25 | 18 | 15 | 11 | 8 | 7 |
| 75:25 test mixture | 72 | 45 | 35 | 30 | 26 | 23 | 16 | 14 |
| 25:75 test mixture | 77 | 50 | 37 | 31 | 27 | 18 | 17 | 16 |
| 10:90 test mixture | 83 | 54 | 43 | 35 | 29 | 24 | 13 | 8 |
| Cement Composition | 56 | 40 | 31 | 24 | 21 | 18 | 12 | 10 |

Table 3 contains initial and 10 minute gel strength data for the drilling fluid, several test mixtures, and the cement composition; and compressive strength data for the test mixtures and the cement composition. Table 3 also contains compressive strength data for several "control test mixtures." The control test mixtures did not contain a set accelerator and contained the stated drilling fluid to cement composition ratio. As can be seen in Table 3, the drilling fluid has low gel strengths, which indicates that it will remain in a fluid state. Moreover, because there is only a difference of 1 unit between the initial and 10 min gel strengths, the drilling fluid is not a progressive gel. As can also be seen in Table 3, each of the test mixtures exhibited better gel strengths compared to the drilling fluid and compared to the cement composition. This indicates that if a cement composition becomes contaminated with the drilling fluid, then the drilling fluid will not have adverse effects on the gel strength of the mixture. Additionally, the test mixtures having a ratio of 25:75 and 10:90 exhibited very good compressive strengths. Again, this indicates that if a cement composition becomes contaminated with up to 33% of the drilling fluid, then the drilling fluid will not have adverse effects on the compressive strength of the mixture. Moreover, each of the test mixtures exhibited a much higher compressive strength compared to the respective control test mixture. As can also be seen, the control test mixture having a drilling fluid to cement composition ratio of 75:25 did not set and remained as a gelled material. This indicates that a drilling fluid without a set retarder, when contaminated with 3 parts of a cement composition will not provide any zonal isolation in a formation; whereas by adding a set accelerator to the drilling fluid, the mixture set and developed a compressive strength of 80 psi (0.6 MPa). The addition of a set accelerator in the drilling fluid should help in providing zonal isolation in a formation.

TABLE 3

| Type of Fluid | 10 s Gel Strength (lb * ft/100 sq ft) | 10 min Gel Strength (lb * ft/100 sq ft) | Compressive Strength (psi) |
|---|---|---|---|
| Drilling Fluid | 8.52 | 9.58 | — |
| 75:25 test mixture | 13.84 | 14.91 | 80 |
| 75:25 control test mixture | — | — | Did not set |
| 25:75 test mixture | 14.91 | 21.30 | 1,843 |
| 25:75 control test mixture | — | — | 504 |
| 10:90 test mixture | 7.45 | 15.97 | 2,280 |
| 10:90 control test mixture | | | 1,300 |
| Cement Composition | 9.58 | 13.84 | 2,350 |

FIG. 1 is a graph of consistency (Bc) versus time (hr:min) showing the thickening time for a test mixture having a drilling fluid to cement composition ratio of 10:90. The test mixture had a thickening time of 14:02. This indicates that if a cement composition becomes contaminated with up to approximately 10% of the drilling fluid, then the drilling fluid will not have adverse effects on the thickening time of the mixture.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of using a drilling fluid comprising:
   drilling a wellbore in a subterranean formation with the drilling fluid, wherein the drilling fluid comprises:
      water and a set accelerator, wherein the set accelerator is selected from the group consisting of sodium metasilicate, potassium orthosilicate, sodium orthosilicate, and combinations thereof, and wherein the set accelerator is in a concentration in the range of about 3% to about 10% by weight of the water, and
      wherein at least a portion of the drilling fluid is capable of mixing with a cement composition;
   introducing a cement composition into the wellbore, wherein the step of introducing the cement composition is performed after the step of drilling, wherein at least a portion of any drilling fluid remaining in the wellbore mixes with the cement composition in the wellbore to form a mixture; and
   allowing the mixture to set;
   wherein a test mixture of the drilling fluid and a cement composition consisting of water and cement, having a drilling fluid to cement composition ratio of 1:3, develops a compressive strength of at least 1,200 psi; whereas, a substantially identical test mixture, except that the drilling fluid does not contain the set accelerator, develops a compressive strength of less than 1,200 psi.

2. The method according to claim 1, wherein the set accelerator is in at least a sufficient concentration such that the test mixture develops a compressive strength of at least 1,200 psi.

3. The method according to claim 1, wherein the drilling fluid further comprises a viscosifier.

4. The method according to claim 3, wherein the viscosifier is selected from the group consisting of a xanthan gum polymer, cellulose, derivatives thereof, and any combinations thereof.

5. The method according to claim 3, wherein the viscosifier is in at least a sufficient concentration such that the drilling fluid has a 10 min gel strength of less than 20 lb*ft/100 sq ft.

6. The method according to claim 1, wherein the drilling fluid further comprises a weighting agent.

7. The method according to claim 6, wherein the weighting agent is selected from the group consisting of barite, hematite, manganese tetroxide, calcium carbonate, and combinations thereof.

8. The method according to claim 6, wherein the weighting agent is selected such that the drilling fluid has a 10 min gel strength of less than 20 lb*ft/100 sq ft.

9. The method according to claim 6, wherein the weighting agent is selected such that the drilling fluid remains in a fluid state for a specified period of time.

10. The method according to claim 1, wherein the drilling fluid further comprises a set retarder.

11. The method according to claim 10, wherein the set retarder is selected from the group consisting of a lignosulfonate, a lignite, a synthetic polymer, and combinations thereof.

12. The method according to claim 10, wherein the set retarder is in at least a sufficient concentration such that the drilling fluid has a 10 min gel strength of less than 20 lb*ft/100 sq ft.

13. The method according to claim 1, wherein the drilling fluid further comprises a dispersant.

14. The method according to claim 13, wherein the dispersant is selected from the group consisting of lignosulfonates, lignite, alcohol derivatives, and combinations thereof.

15. The method according to claim 1, further comprising the step of introducing a spacer fluid into the wellbore after the step of drilling.

16. The method according to claim 1, wherein the drilling fluid does not contain a clay.

17. A method of using a drilling fluid comprising:
drilling a wellbore in a subterranean formation with the drilling fluid, wherein the drilling fluid comprises:
water and a set accelerator, wherein the set accelerator is selected from the group consisting of sodium metasilicate, potassium orthosilicate, sodium orthosilicate, and combinations thereof, and wherein the set accelerator is in a concentration in the range of about 3% to about 10% by weight of the water, and
wherein the drilling fluid has a 10 minute gel strength of less than 20 lb*ft/100 sq ft,
wherein the drilling fluid has a density in the range of about 9 to about 14 pounds per gallon,
wherein the drilling fluid remains pourable for at least 5 days, and
wherein when at least one part of the drilling fluid mixes with three parts of a cement composition consisting of water and cement, the drilling fluid cement composition mixture develops a compressive strength of at least 1,200 psi;
introducing a cement composition into the wellbore, wherein the step of introducing the cement composition is performed after the step of drilling, wherein at least a portion of any drilling fluid remaining in the wellbore mixes with the cement composition in the wellbore to form a mixture; and
allowing the mixture to set.

18. The method according to claim 17, wherein the drilling fluid does not contain a clay.

* * * * *